US008257088B1

(12) United States Patent
Askins (10) Patent No.: US 8,257,088 B1
(45) Date of Patent: Sep. 4, 2012

(54) GEOMETRIC ASSEMBLY FOR THERAPEUTIC OR ATHLETIC USE

(76) Inventor: Craig Askins, Brighton, MI (US)

( * ) Notice: Subject to any disclaimer, the term of this patent is extended or adjusted under 35 U.S.C. 154(b) by 544 days.

(21) Appl. No.: 12/504,928

(22) Filed: Jul. 17, 2009

Related U.S. Application Data

(60) Provisional application No. 61/129,783, filed on Jul. 18, 2008.

(51) Int. Cl.
*A63B 69/00* (2006.01)
(52) U.S. Cl. ...................................... 434/247
(58) Field of Classification Search .................. 434/247, 434/251, 255, 258; 473/440, 454, 455, 479; 482/14, 15
See application file for complete search history.

(56) References Cited

U.S. PATENT DOCUMENTS

| | | | |
|---|---|---|---|
| 3,008,711 A | | 11/1961 | Dillon |
| 3,255,115 A | * | 6/1966 | Peterson ........................ 482/148 |
| 3,312,467 A | * | 4/1967 | Dawson ......................... 473/454 |
| 3,722,153 A | | 3/1973 | Baer |
| 3,794,316 A | | 2/1974 | Toman |
| 3,970,301 A | | 7/1976 | Lehmann |
| 4,097,043 A | | 6/1978 | Rudy |
| 4,108,435 A | * | 8/1978 | Coleman ....................... 473/440 |
| 4,134,586 A | * | 1/1979 | King ............................. 473/440 |
| 4,340,217 A | | 7/1982 | Gills |
| 4,446,666 A | | 5/1984 | Gilman |
| 4,556,219 A | * | 12/1985 | Tillery .......................... 473/197 |
| 5,007,220 A | | 4/1991 | Lalvani |
| 5,201,160 A | | 4/1993 | Sanchez |
| 5,330,400 A | | 7/1994 | Huberman |
| 5,405,304 A | | 4/1995 | Petersheim |
| 5,505,035 A | | 4/1996 | Lalvani |
| 5,779,241 A | * | 7/1998 | D'Costa et al. ............... 273/371 |
| 5,823,925 A | | 10/1998 | Webster |
| 5,944,318 A | * | 8/1999 | Payton .......................... 273/402 |
| 5,989,130 A | * | 11/1999 | Macaluso ..................... 473/197 |
| 6,162,110 A | * | 12/2000 | Szumowski .................. 446/255 |
| 6,174,266 B1 | | 1/2001 | Merrill |
| 6,464,619 B1 | | 10/2002 | Bondi |
| 6,579,196 B1 | | 6/2003 | Yoon |
| 6,811,501 B2 | * | 11/2004 | Kuzia et al. ................... 473/478 |
| 6,942,487 B2 | * | 9/2005 | Corbalis ....................... 434/247 |
| 7,052,437 B2 | | 5/2006 | Kohler |
| 7,118,487 B2 | * | 10/2006 | Turcot .......................... 473/197 |
| 2009/0233737 A1 | * | 9/2009 | Lerch ........................... 473/452 |
| 2009/0286656 A1 | * | 11/2009 | Okamoto ...................... 482/78 |
| 2009/0291780 A1 | * | 11/2009 | Gutierrez ..................... 473/426 |

* cited by examiner

*Primary Examiner* — Kurt Fernstrom
(74) *Attorney, Agent, or Firm* — Milbank, Tweed, Hadley, McCloy, LLP (57) ABSTRACT

A portable assembly forming a polyhedron or other geometric-shaped enclosure, the assembly comprising a framed enclosure member having generally the shape of a polyhedron when erected, multiple frame member supports that form edges of the polyhedron-shaped enclosure, the multiple frame member supports supporting the framed enclosure member, and multiple tensile members, each tensile member removably attached to a point along a longitudinal axis of a first frame member support, the tensile member extending from the first frame member support through the polyhedron-shaped enclosure and removably attached to a point along a longitudinal axis of a second frame member support, the tensile member extending from the second frame member support through the polyhedron-shaped enclosure to a point along a longitudinal axis of a third frame member support such that the tensile members form peripheries of multiple voids inside the polyhedron-shaped enclosure.

20 Claims, 9 Drawing Sheets

GEOMETRIC ASSEMBLY FOR THERAPEUTIC OR ATHLETIC USE

CROSS-REFERENCE TO RELATED APPLICATIONS

This application claims priority to U.S. Provisional Application No. 61/129,783 filed on Jul. 18, 2008, the disclosure which is hereby incorporated by reference.

FIELD OF THE INVENTION

The invention relates to a portable assembly for therapeutic or athletic use, and in particular an assembly having a frame that forms a geometric-shaped enclosure and having multiple tensile members extending through the enclosure such that users can practice movements using the tensile members as indicators of the user's proximity and body positioning.

BACKGROUND OF THE INVENTION

In the art of athletic training and therapeutic treatment, the concept of proprioception, or the awareness of the relative position of one's body parts in relation to each other, has been used to teach athletes and patients to recognize and correct body positioning. A related concept also used to teach body position and movement is kinesthetic awareness, or the awareness of movement as a body part moves along a path. Proprioception and kinesthetic awareness are essentially feedback mechanisms; that is, as the body changes position, information about the position and movement is exchanged with the brain. Adjustments can be made based on the transmitted information so that the athlete or patient can learn to position a body part to a predetermined position or move along a predetermined pattern of movement.

Physical therapists, for example, use the concepts of kinesthetic awareness and proprioception to teach body awareness and positioning. Proprioception is unconscious initially, but can be enhanced with training. Specialized sensory receptors in the muscles, joints and connective tissues enable the body to process information from a variety of stimuli, and turn that information into action. Through awareness and cognitive processing of a body's position in space, the central nervous system and sensory receptors can be conditioned to be more responsive to length and tension in the muscles and tendons.

A user can condition the central nervous system and sensory receptors to be more responsive to environmental stimuli through activities that require coordination, balance, agility and movements that challenge a user's normal range of motion. The concept of conditioning the central nervous system and sensory receptors is called proprioceptive adaptation and through training, users can become increasingly aware of their movements.

The current invention allows practitioners to create a spectrum of simple to complex challenges utilizing all of the characteristics required for propriceptive adaption: balance, coordination, agility, power and range of motion. The invention allows a user to increase body positioning awareness and combines balance, strength and quickness that result in a user's heightened ability to make instant decisions about what their capabilities are in non-simulated situations.

DETAILED DESCRIPTION OF THE INVENTION

Figure 1:
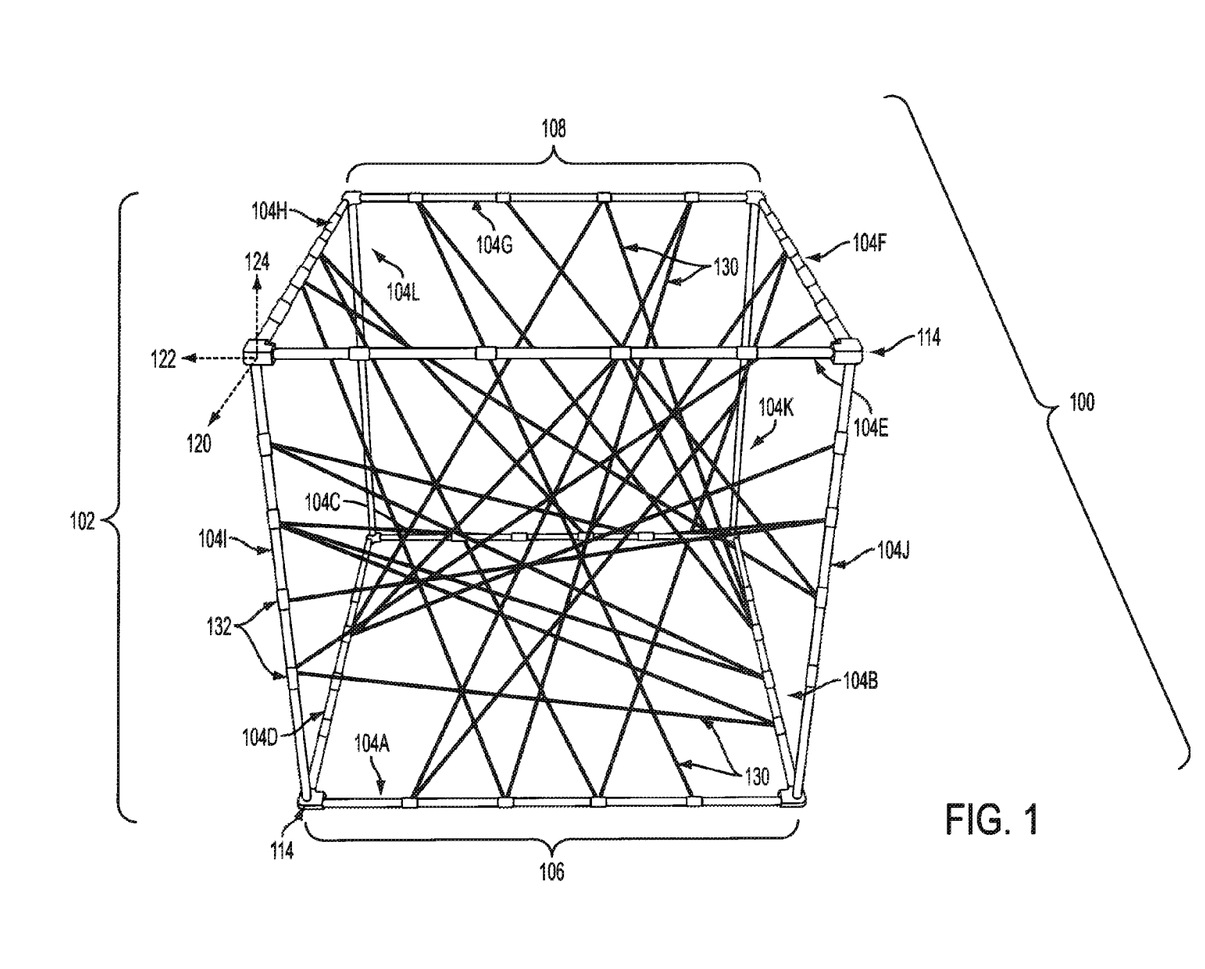
FIG. 1 is a perspective view of an erected assembly according to the present invention.

Referring to the drawings, FIG. 1 depicts an embodiment of an assembly of the invention. The assembly 100 is composed of multiple frame member supports 104 A-L. The frame member supports 104 A-L are of any suitable shape and can be in particular cylindrical or tubular in shape. The frame member supports 104 A-L are connected to form a framed enclosure 102 that is generally the shape of a non-solid polyhedron, such as a cube, rectangular prism, or other geometric shape. In the embodiment shown in FIG. 1, the polyhedron-shaped framed enclosure 102 has six square faces, facets, or sides, with three faces, facets or sides meeting at a vertex.

The framed enclosure 102 has a base side 106, which is formed by frame member supports 104A, 104B, 104C and 104D. The base side 106 may be positioned on top of a substantially flat surface, such as a ground or floor. A top side 108 of the framed enclosure 102 is formed by frame member supports 104E, 104F, 104G and 104H. The top side 108 lies substantially parallel to the base side 106. The framed enclosure 102 has four vertical sides: vertical back side (104K, 104G, 104L and 104C); vertical front side (104J, 104E, 104I and 104A); vertical right side (104K, 104F, 104J and 104B); and vertical left side (104L, 104H, 104I and 104D). Each vertical side is defined by four frame member supports (104I, 104J, 104K, 104L) that extend vertically from the base side 106 and support the top side 108. The top, base and vertical sides in the described embodiment are equal in area and structure such that the assembly functions and looks the same whether the assembly is turned on its side or is upside down such that the top side is positioned on a ground or floor. The interchangeable positioning of the sides allows for ease of set up and a variety of uses. However, other geometric shapes are possible, for example, the base side may be larger or smaller in area than the top side, as further discussed below.

Figure 2:
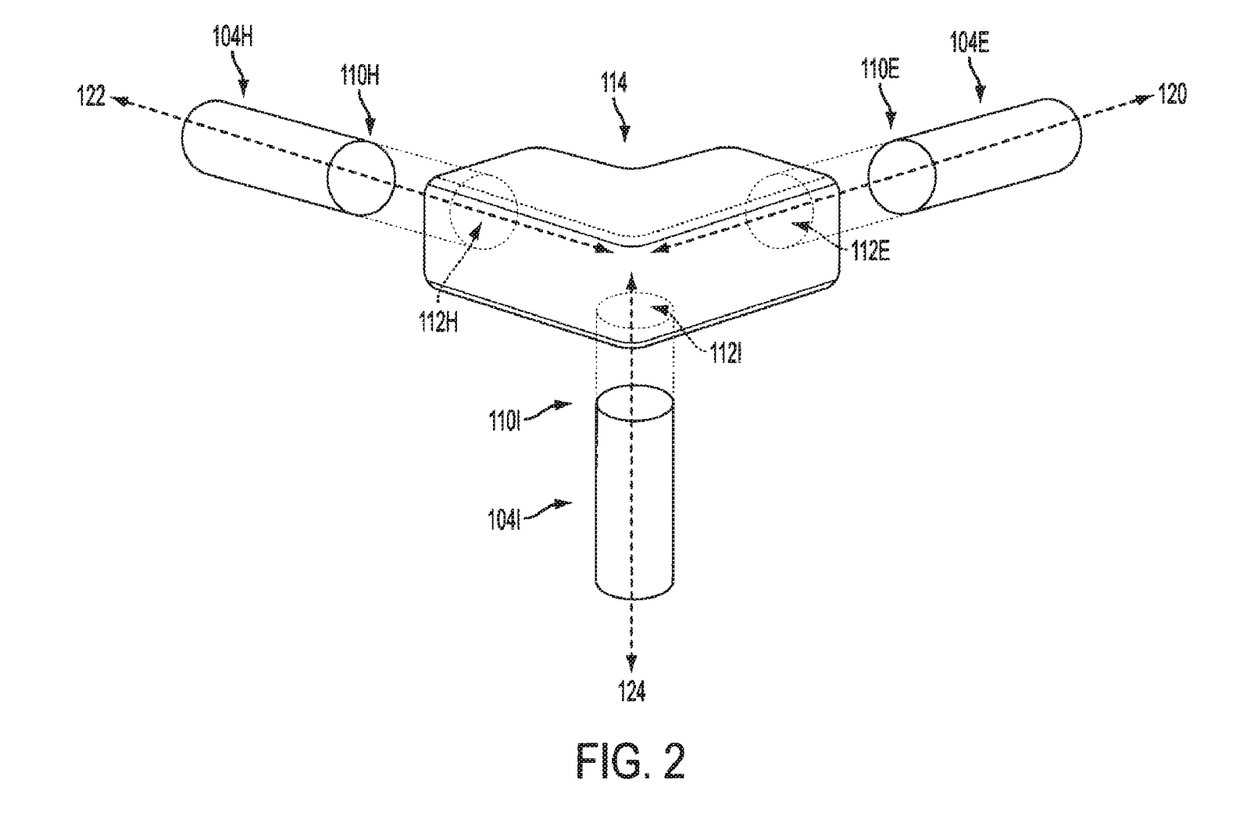
FIG. 2 is an exploded view of a portion of an erected assembly showing details of a frame support connecting member.

At each vertex of the polyhedron-shaped enclosure, three sides are joined or connected by a connecting member 114. FIG. 2 shows, in detail, an example of a connecting member 114 joining frame member supports 104E, 104H and 104I. The connecting member 114, as shown in FIG. 2, is an L-shaped element having three apertures or openings 112 (112E, 112H, 112I). Each aperture or opening is configured to receive and secure one end 110 (110E, 110H, 110I) of a frame member support 104 (104E, 104H, 104I). The openings 112E, 112H, and 112I open in the direction of three independent axes, 120, 122 and 124, respectively, as shown in FIG. 2. Two openings 112E and 112H extend orthogonally in two horizontal directions and one opening 112I extends orthogonally in a vertical direction. The openings 112E and 112H cooperate with frame member supports 104E and 104H to form two edges of the horizontal, top side 108 of the polyhedron-shaped enclosure. The opening 112I is vertically facing and receives a frame member support 104I that extends vertically and downward from the connecting member toward the base side 106 of the polyhedron-shaped enclosure. The frame member support 104I forms one edge of the front, vertical side of the polyhedron-shaped enclosure of FIG. 1.

In one embodiment shown in FIG. 1, eight connecting members 114 connect the frame member supports 104 A-L to form the polyhedron-shaped enclosure. The horizontally-facing openings of the connecting members receive the horizontal frame member supports and form the top and base sides, while the vertically-facing openings of the connecting members 114 receive the vertical frame member supports and form the vertical sides of the polyhedron-shaped enclosure. The vertical frame member supports 104 I-L extend from the base side 106 to the top side 108 and form columns that support the assembly 100 in its erected form.

Each end of a frame member support 104 A-L is connected to an opening of a connecting member 114. In one embodiment, each frame member support 104 A-L is threaded at each end such that the end of the frame member support can be inserted into an opening 112 of a connecting member 114 and rotated to tighten the end into the opening, securely locking the frame member support into the opening 112 and into position. In other embodiments, each end of a frame member support 104 A-L is removably connected to an opening of a connecting member 114 by fastening means such as screws, nuts, bolts, studs, welds, nails, rivets, roll pins, push-button springs, or any other suitable fastening means. In other embodiments, the frame member supports are removably connected in an opening by a set screw that exerts force upon the outside surface of the frame member support. In other embodiments, the frame member supports have a hole at a first point along the outside surface such that a set screw extends from a connecting member through the hole and through the frame member support and exerts a force on a second point on the inside surface of the frame member support against a surface of the connecting member. In other embodiments, the frame member supports fit within the openings of the connecting member by friction fit. In other embodiments, the frame member supports are fixedly connected to the openings of the connecting member by welding, soldering, brazing the ends of the frame member supports into the openings of the connecting members. In still further embodiments, the frame member supports are connected to the connecting members by hinges or joints that allow the frame member support to pivot about the hinge or joint.

In one embodiment, as shown in FIG. 2, the frame member supports 104 extend along axis 120, which is orthogonal to axis 122, which is orthogonal to axis 124. In another embodiment, the independent axes are not orthogonal and are not at equal angles. In further embodiments, the connecting members have more than three openings to allow for interconnection of more than three frame member supports.

The frame member supports 104 A-L are cylindrical or tubular in shape and are made of a lightweight metal such as aluminum or titanium in one embodiment, and in other embodiments are made of plastic or other composite material. The connecting members 114 are preferably made of the same material as the frame member supports 104 but need not be so made. In other embodiments, the connecting members 114 are made of a lightweight metal such as aluminum or titanium, and in other embodiments are made of plastic, rubber, or similar material. The openings 112 can be either square, circular, elliptical, or of any shape that securely connects the ends of the frame member supports 104 A-L.

In one embodiment, as shown in FIG. 1, the frame support members 104 A-L are all of the same length and are interchangeable such that any frame member support can fit into the openings 112 of the connecting members 114 to form either vertically extending or horizontally extending frame member supports. Because the frame member supports are interchangeable, the top and base sides can easily function as vertical sides of the polyhedron. In other embodiments, the frame member supports 104 A-L are of two different lengths such that the frame member supports form a polyhedron such as a cuboid or rectangular prism. For example, in a polyhedron-shaped enclosure of a rectangular prism, frame member supports 104 A-D and 104 E-H, which form the top and base sides, are of equal length and frame member supports 104 I-L that form the vertical sides are of equal length. In yet further embodiments, the frame member supports are of various lengths and can be connected to form a non-traditional geometric shape with multiple sides.

Referring again to FIG. 1, multiple tensile members 130 extend through the polyhedron-shaped enclosure formed by the frame member supports 104 A-L. The tensile members 130 are attached to the frame member supports 104 A-L and are, in one embodiment, attached directly to the frame member supports 104 A-L, such as by being securely tied around the perimeter of the frame member supports 104 A-L. The tensile members are, in one embodiment, removably attached to the frame member supports by tensile member connectors 132 which may be made of any suitable material such as, for example, plastic, nylon, velcro, hooks, snaps or the like.

Figure 3:
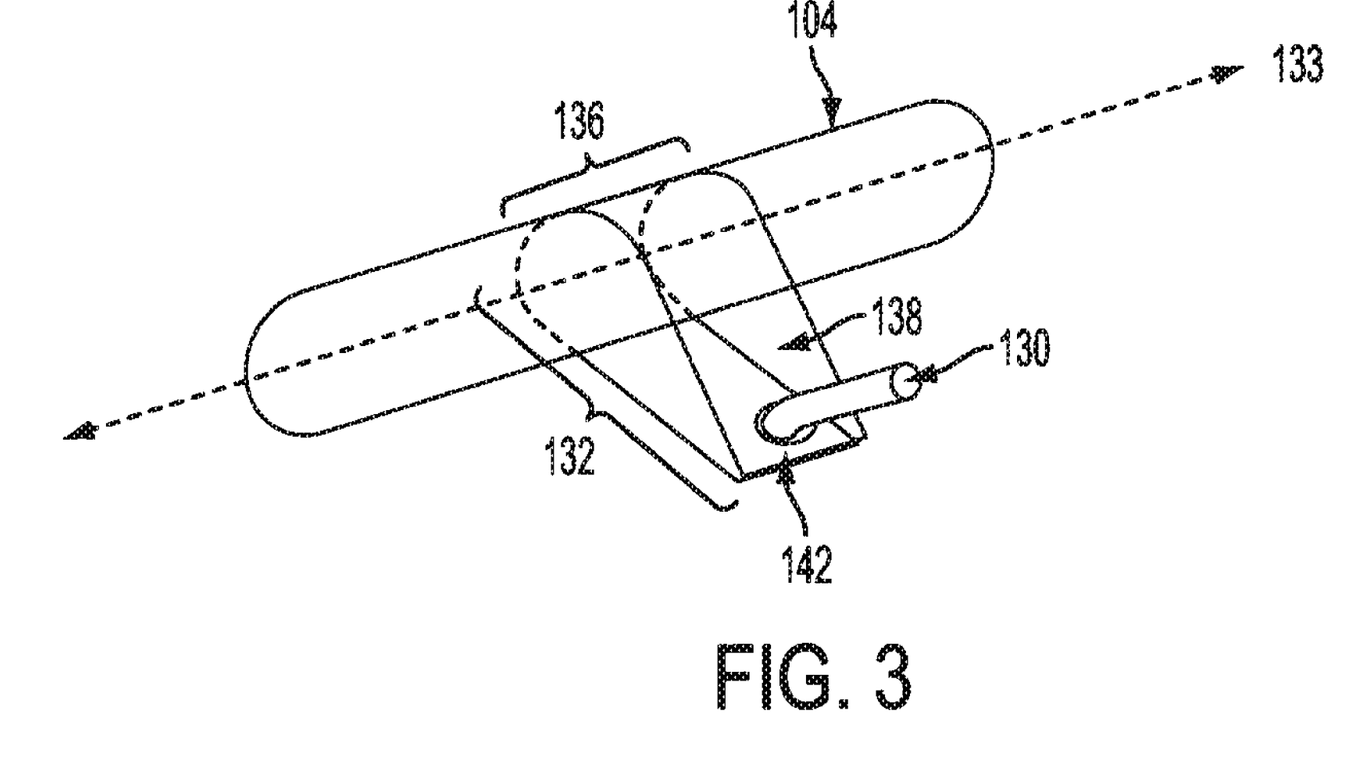
FIG. 3 is an exploded view of a portion of an erected assembly showing details of a tensile member connector.

As shown in detail in FIG. 3, a tensile member connector 132 is slidably attached at a location along the longitudinal axis 133 of a frame member support 104. A tensile member connector 132 is, in one embodiment, a tying strap made of a rectangular piece of nylon material that has been folded over to form a loop at one end 136 and a flat surface on the other end 138. The flat surface 138 of the tensile member connector has an opening 142 in substantially the center of the flat surface of the tensile member connector 132. The opening 142 is, in one embodiment, defined by a metal ring that outlines the perimeter of the opening. The tensile member connector 132 is slidably attached to a frame member support 104 such that the cylindrical frame member support 104 fits through the loop 136 formed by the tensile member connector 132. The flat surface 138 of the tensile member connector 132 extends inward toward the polyhedron-shaped enclosure formed by the frame member supports 104 A-L.

Figure 4:
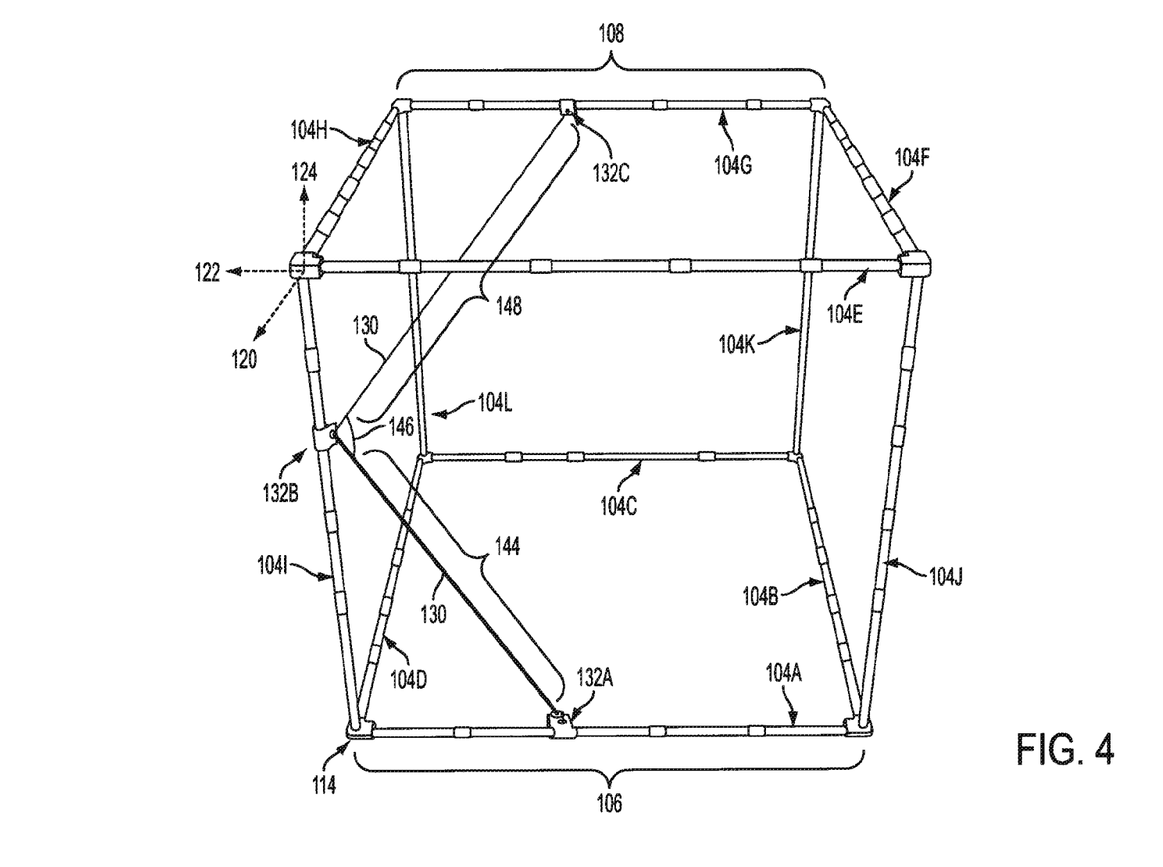
FIG. 4 is a perspective view of a portion of an erected assembly showing the arrangement of a tensile member.

In one embodiment, each tensile member 130 is removably attached to a tensile member connector 132. The tensile member 130 is securely tied directly to the opening 142 of the tensile member connector, as shown in FIG. 4. FIG. 4 illustrates a portion of an embodiment of the erected assembly that shows a tensile member 130 extending through the polyhedron-shaped enclosure of the assembly. The tensile member 130 is securely tied to an opening in the tensile member connector 132A, which is removably attached to frame member support 104A. The tensile member 130 extends from the tensile member connector 132A to a second tensile member connector 132B located at a point along a longitudinal axis of a second frame member support 104I. In the embodiment shown, the second frame member support 104I is adjacent to the first frame member support 104A. In other embodiments, the second frame member support can lie parallel to, adjacent to, or across from the first frame member support. The tensile member 130 extends through the polyhedron-shaped enclosure formed by the frame member supports 104A-L.

The tensile member 130 is looped through the opening of the second tensile member connector 132B such that a first portion 144 of the tensile member extends at an angle 146 from a second portion 148 of the tensile member 130. The angle 146 formed can be of any degree and it will be appreciated that the angle can be changed by sliding tensile connecting members 132A, 132B and 132C along the longitudinal axis of their respective frame support members. The second portion 148 of the tensile member extends from the second tensile member connector 132B toward a third tensile member connector 132C located at a point along the longitudinal axis of a third frame member support 104G. The tensile member 130 is securely tied directly to the opening of the third tensile member connector 132C by directly tying the tensile member connector to the opening of the third tensile member connector 132C.

In other embodiments not shown, the tensile members 130 can be attached to the frame member supports 104 A-L by turnbuckles, hooks, hook and loop straps, snaps, clamps or other fastening devices. The fastening devices must be suitable to withstand the tension created by the tensile members, but also suitable to release the tensile member so that a user can change the positioning of a tensile member without difficulty. In further embodiments, the fastening device has a safety mechanism to prevent a tensile member from releasing while a user is using the assembly.

In further embodiments, a tensile member connector can extend from one frame member support to a second frame member support without extending to a third frame member support. In one embodiment, each tensile member is removably attached to a first tensile member connector that is located at a point along a longitudinal axis of a first frame member support. The tensile member extends through the polyhedron-shaped enclosure of the assembly and is removably attached to a second tensile member connector located at a point along a longitudinal axis of a second frame member support. In the embodiment, multiple tensile members connect two frame member supports and extend through the polyhedron-shaped enclosure as shown, for example, in FIG. 1.

In one embodiment, the tensile members 130 are elastomeric such that the tensile member 130 can stretch to various lengths and form various tensions. In other embodiments, the tensile members are not elastomeric. The tensile members generally can be of tubular or cylindrical shape, but it is also contemplated that the tensile members have two opposing relatively flat surfaces, such as flat, elastomeric bands, sheath, triangular, oblong, multi-sided or multi-faceted tensile members.

The size, number and arrangement of the tensile members 130 can be determined by a user and is dependent on the activity performed with the assembly. For example, as a user's skill increases, the diameter of the tensile members can decrease. For example, a stroke victim who has suffered a loss of sensory awareness can be instructed to navigate a network of tensile members with large diameters. Soft, velvet ropes can be used, for example. As the user increases her ability to judge the location of the tensile members, a practitioner can increase the difficulty of the tasks being performed by decreasing the size of the tensile members, and hence decreasing the size of the user's targets. In one embodiment, the tensile members 130 range in diameter between 1 mm and 10 inches. In other embodiments, the tensile members range in diameter between 1 inch and 3 inches. The tensile members can also be of uniform or varying thickness in order to create a spectrum of various tactile experiences.

The tensile members can also be of a uniform or varying tension. Tensile members of different resistances can be used depending on the intended application of the assembly. For example, tensile members can be pulled taught to create a rigid network of tensile members, or the tensile members can have slack such that the tensile member gives way to various pressures of touch. A user may be asked to exert a specific force on certain tensile members and to exert a different force on other tensile members. For example, a user that does not have a strong awareness of how much pressure he exerts in a simple activity—such as giving a person a hug—may be instructed to exert the same pressure that he would exert in a hug on one tensile member. The user may then be asked to exert the same pressure that he would exert when opening a door on another tensile member. The purpose of the varying tensions of the tensile members is to teach the user, through proprioceptual stimulation, the correct pressure to exert when performing different activities. Through repeated exercise, a user can grade or regulate the pressure they exert and be able to appropriately respond in non-simulated environments.

In one embodiment, a tensile member 130 is a cord, shock cord, bungee cord, rope, string, cable or other generally cylindrical fiber. In other embodiments, the tensile members are tubing, such as latex or silicon tubing, that is able to withstand various weight, such as the weight of one or multiple users. In other embodiments, the tensile members are flat bands, or tubing with various shapes such as triangular, multi-sided or oblong. In further embodiments, the tensile members are flat bands, oblong, triangular, or filaments having multiple facets.

In one embodiment, the tensile members are multi-colored, and in other embodiments are brightly colored such as blue, yellow, green and red in color. The number of tensile members can vary depending on the user's preference and intended use of the assembly, and it is contemplated that the member of tensile members can vary between 1 and 150 although a larger number of tensile members may be used. The number of tensile members is, in another embodiment, between 25 and 100 and in further embodiments is between 50 and 100. The number of tensile members depends on the application of the assembly. For example, fewer tensile members can be used when the assembly is used to teach a user to perform specific tasks in relation to certain tensile members. More tensile members can be used in an athletic use of the assembly, for example, when a user is instructed to step into multiple voids created by the tensile members.

Figure 5:
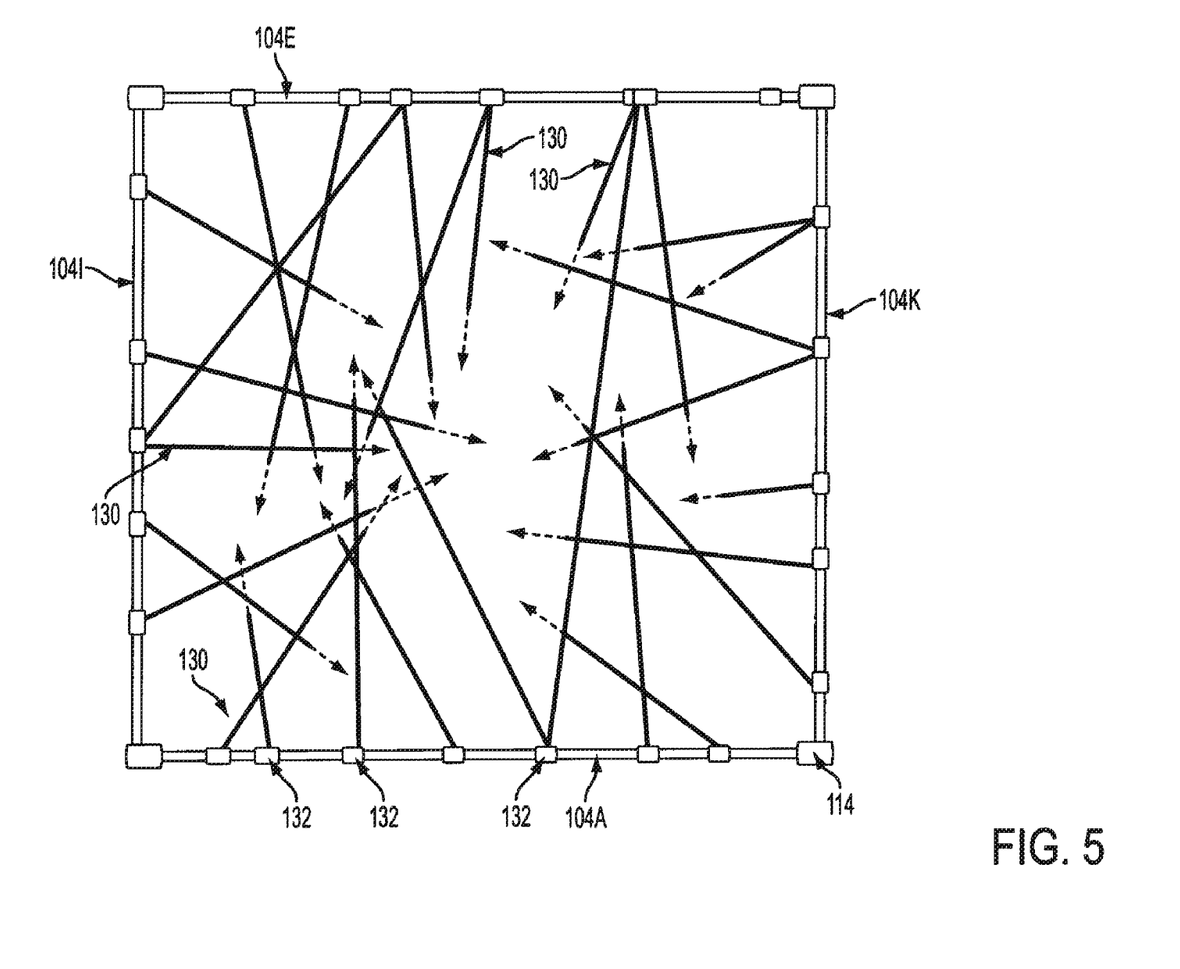
FIG. 5 is side view of an erected assembly according to the present invention.

FIG. 5 depicts a side view of the assembly of FIG. 1. The embodiment of FIG. 5 shows a cube-shaped framed enclosure member and shows the front, vertical side of the embodiment in FIG. 1. As noted above, the frame member supports 104 A-L in a cube-shaped assembly are of the same length and are interchangeable as horizontal or vertical frame member supports for ease of assembly. In the embodiment shown, frame member supports 104 A, E, I and K are of the same length.

Figure 6:
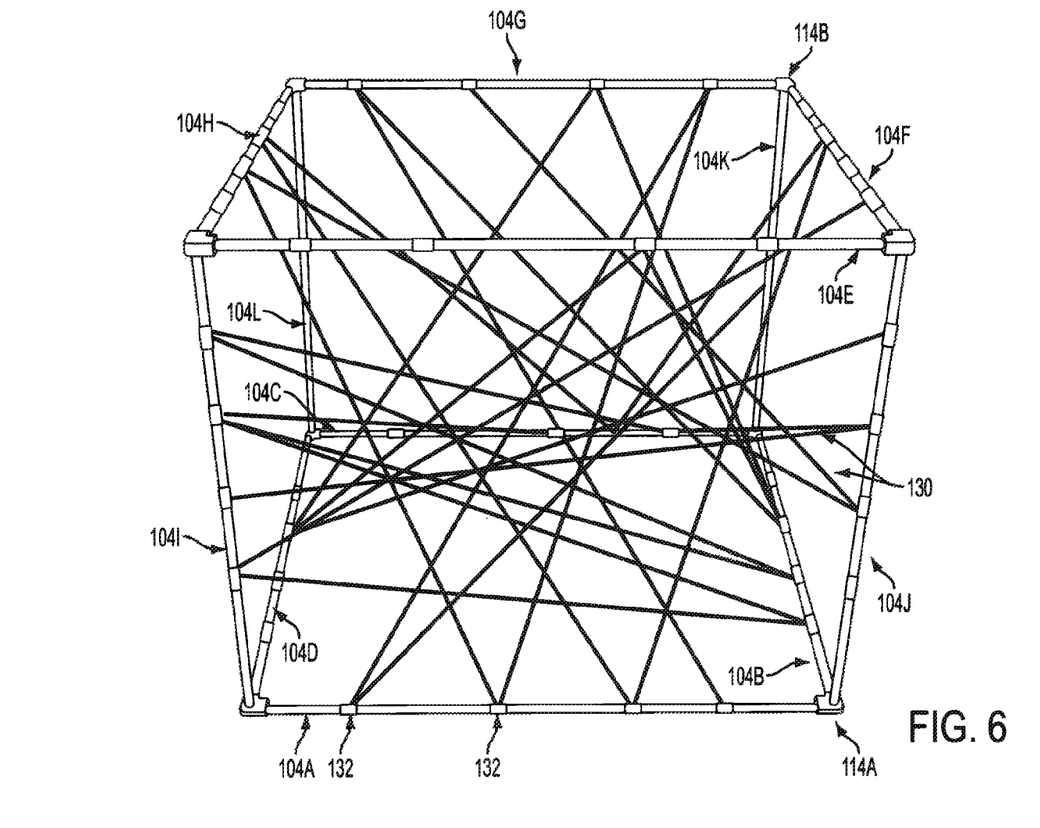
FIG. 6 is a perspective view of an erected assembly of another embodiment according to the present invention.

FIG. 6 depicts an embodiment of the invention showing a framed enclosure generally in the shape of a rectangular prism. The frame member supports 104 A-L in a rectangular prism-shaped assembly are of two different lengths such that the frame member supports 104 A-D and 104 E-H are of a first length and frame member supports 104 I-L are of a second length. The frame member supports 104 A-D form a base side 106 and frame member supports 104 E-H form a top side 108 that lies substantially parallel to the top side 106. The frame member supports 104 I-L form vertical sides that lie in substantially parallel planes. The frame member supports 104I-L support the top side 108 when the assembly is in erected form.

The connecting members 114 are similar to the connecting members as shown in FIG. 2 and can be interchanged at any vertex of the polyhedron for ease of assembly. For example, a connecting member 114A connecting frame member supports 104A, 104B, and 104J can be interchanged with connecting member 114B that connects frame member supports 104F, 104G, and 104K.

As described above, the tensile members in FIG. 6 are elastomeric such that the tensile member 130 can stretch to various lengths and form various tensions. The tensile members generally can be of tubular or cylindrical shape, but it is also contemplated that the tensile members have two opposing relatively flat surfaces, such as flat, elastomeric bands, sheath, triangular, oblong, multi-sided or multi-faceted tensile members. The size of the tensile members 130 can be determined by a user and is dependent on the activity performed with the assembly. In one embodiment, the tensile members 130 range in diameter between 1 mm and 10 inches. In other embodiments, the tensile members range in diameter between 1 inch and 3 inches. The tensile members can also be of uniform or varying thickness and resistance in order to create a spectrum of various tactile experiences. In one embodiment, a tensile member is a cord, shock cord, bungee cord, rope, string, cable or other generally cylindrical fiber. In other embodiments, the tensile members are tubing, such as latex or silicon tubing, that is able to withstand various weight, such as the weight of one or multiple users. In other embodiments, the tensile members are flat bands, or tubing with various shapes such as triangular, multi-sided or oblong. In further embodiments, the tensile members are flat bands, oblong, triangular, or filaments having multiple facets.

Figure 7:
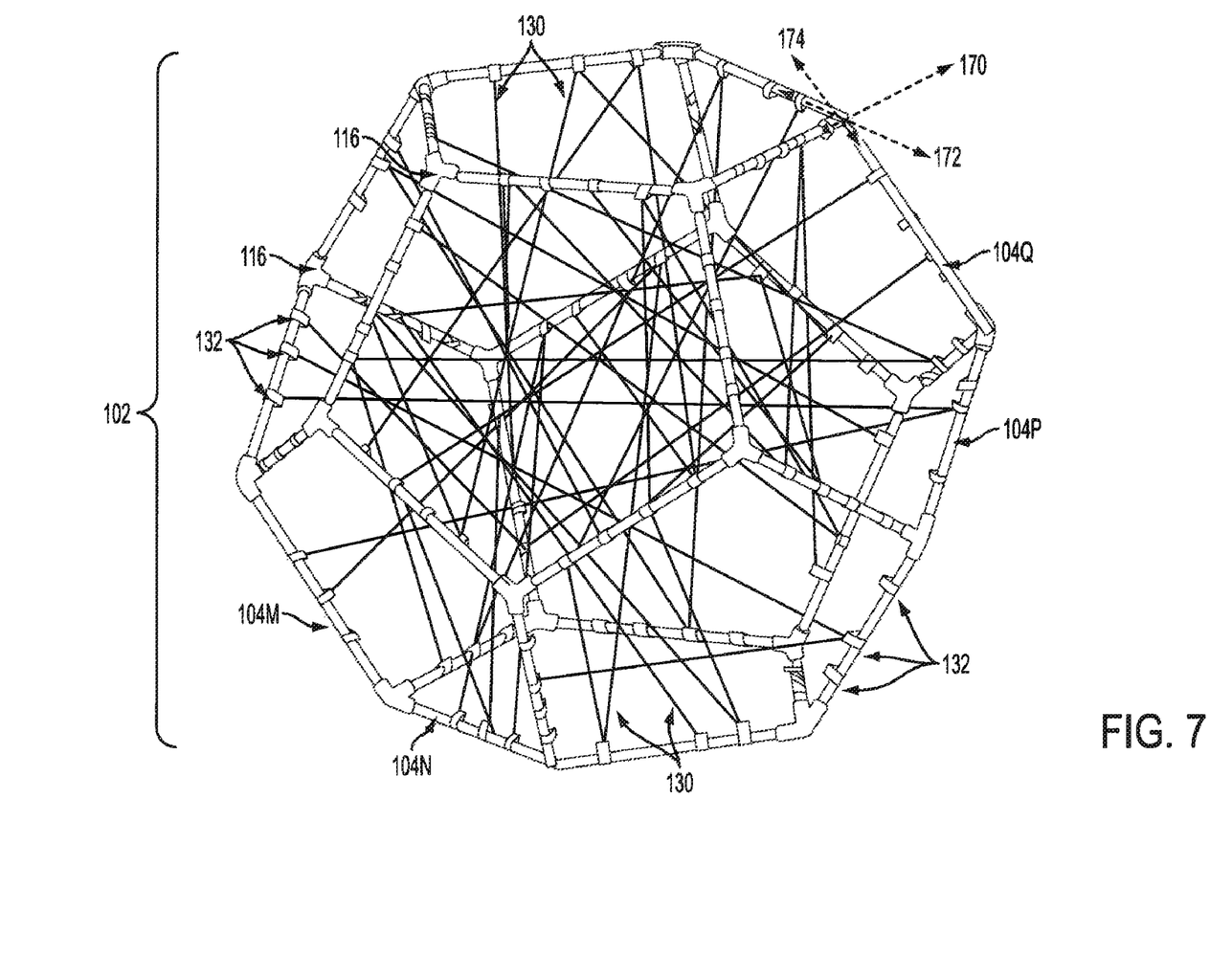
FIG. 7 is another perspective view of an erected assembly of yet another embodiment according to the present invention.

FIG. 7 shows a framed enclosure member 102 generally having a polyhedron-shaped enclosure with more than six sides. In the particular embodiment, the polyhedron-shaped enclosure is a dodecahedron. The frame member supports 104 of the depicted embodiment are of the same length and size and are interchangeable at any vertex of the dodecahedron for ease of assembly. For example, frame member supports 104M, 104N, 104P, and 104Q are interchangeable in the embodiment shown. The tensile member connectors 132 of FIG. 7 are removably attached to the frame member supports 104A-L, as in previous embodiments shown, and connect the tensile members 130, which extend through the polyhedron-shaped enclosure of the framed enclosure member 102. In the depicted embodiment, the tensile members 130, as describe above, can be of uniform or varying length, resistance, thickness and shape depending on the intended use of the assembly.

The connecting member 116, as shown in FIG. 7, is a Y-shaped element having three apertures or openings. The openings extend along three independent axes 170, 172 and 174 that are not orthogonal from each other. Each end of a frame member support 104 is connected to an opening of a connecting member 116. In one embodiment, each frame member support 104 has two ends that are threaded such that each end of the frame member support can be inserted into an opening of a connecting member 116 that is also threaded. The frame member support is inserted into the opening and rotated to tighten and securely lock the frame member support into the opening of the connecting member 116 and into position. In other embodiments, each end of a frame member support is removably connected to an opening of a connecting member 116 by fastening means such as screws, nuts, bolts, studs, welds, nails, rivets, roll pins, push-button springs, or any other suitable fastening means, or without fastening means such as by friction fit. In other embodiments, the frame member supports are fixedly connected to the openings of the connecting member by welding, soldering, brazing the ends of the frame member supports into the openings of the connecting members. In still further embodiments, the frame member supports are connected to the connecting members by hinges or joints that allow the frame member support to pivot about the hinge or joint.

In an another embodiment, the polyhedron-shaped enclosure approaches the shape of a sphere. In yet another embodiment not shown, the framed enclosure is a sphere without defined sides. In a sphere-shaped device, the frame support members can be curved in a convex manner such that the frame support members, when connected, form a sphere shape. The sphere-shaped assembly can either be positioned on the ground or on a floor or suspended above a floor. The sphere can be suspended using, for example, cables strong enough to hold the assembly as well as support any weight added to the enclosure of the assembly, for example the weight of one or multiple adult or children. Multiple sphere-shaped assemblies can be aligned together in suspended form, for example, aligned to create a series of adjacent spheres touching at a point along the outer surface of the spheres. The spheres can have different obstacles created by the tensile members, for example, and a user can be instructed to climb to levels with progressively harder obstacles.

Figure 8:
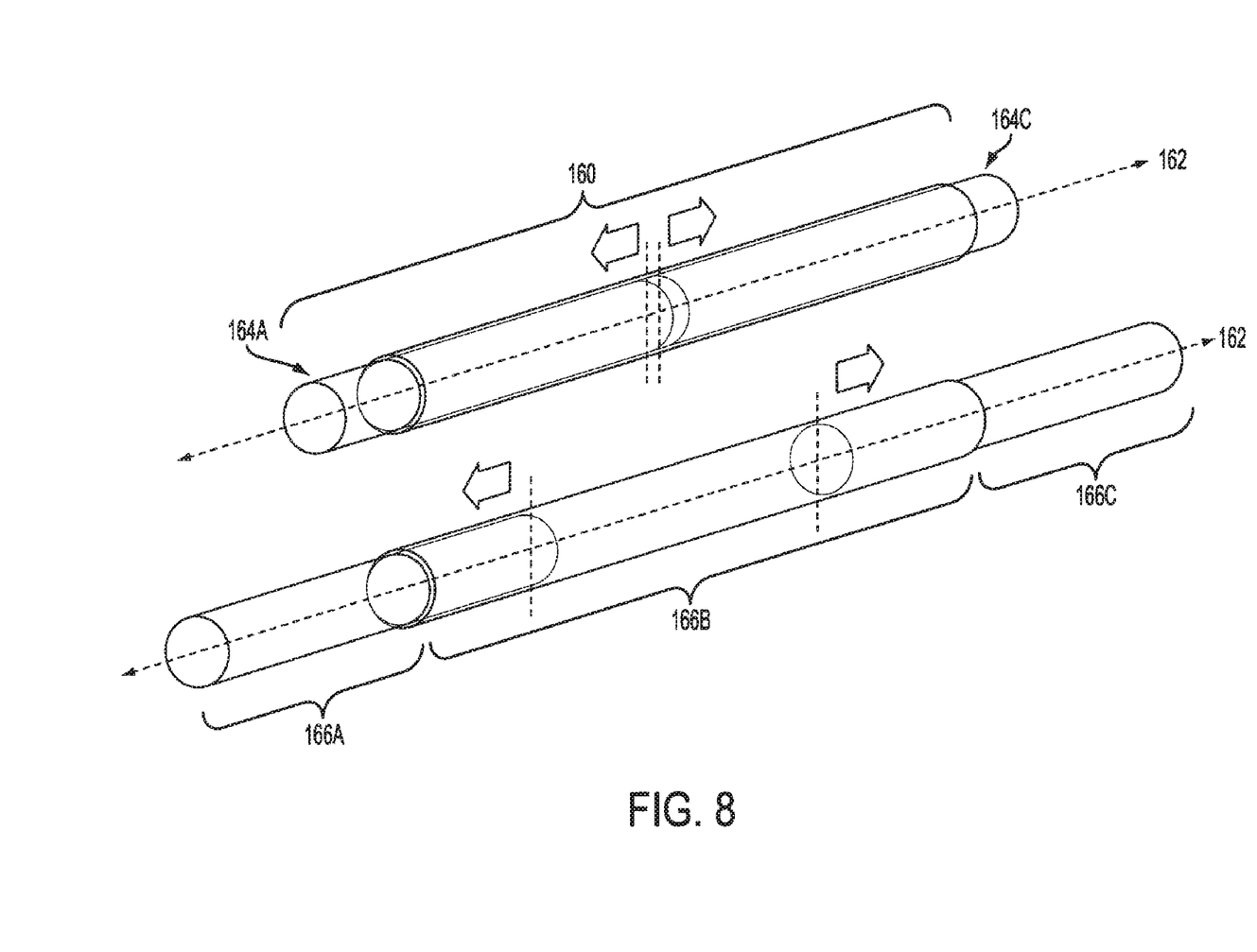
FIG. 8 is an exploded view of a portion of the assembly showing details of an adjustable support member.

FIG. 8 is an exploded view of an adjustable frame member support 160. The adjustable frame member support 160 of the embodiment shown is adjustable in length such that the adjustable frame member support 160 can be adjusted along a longitudinal axis 162 of the adjustable frame member support. The adjustable frame member support 160 can be adjusted to a particular length prior to configuration of the assembly. In one embodiment as shown in FIG. 8, the adjustable frame member support 160 is telescoping in nature and adjusts to different lengths by pulling on the ends 164A and 164C of the adjustable frame member support 160. The ends are rotated until each frame member support segment 166A, 166B, and 166C is securely locked in relation to an adjoining frame member support segment. The adjustable frame member supports are tubular or cylindrical in shape and can have a simple stop mechanism to lock the frame member support segment in relation to an adjoining segment. The stop mechanism can be a simple mechanism such as grooves, indents, detents, pins, notches, screws or pins and holes.

In one embodiment, frame member support segments 166A and 166C collapse inside frame member support 160 for compact storage and convenience. When in a collapsed position, the distal ends of each of frame member support segments 166A and 166C are aligned to be substantially flush with the ends of the middle frame support segment 166B of the adjustable frame member 160. In other embodiments not shown, the adjustable frame member support 160 has stop button detents, grooves, indents, detents, pins, notches, screws or pins and holes to securely lock the segments in relation to the other segments.

The frame member supports are between 6 inches and 10 feet in length when the assembly is erected. In another embodiment, the frame member supports are between 4 and 7 feet in length when erected. The length of the frame member supports varies depending on the application of the invention. For example, an athlete may be asked to perform various agility exercises within the assembly. An athlete may be instructed to climb into the enclosure by stepping over a frame member support that is positioned on the ground or on a floor. In one embodiment, the athlete is instructed to step around certain tensile members, to step on certain tensile members, or to step into the voids created by the tensile members. Climbing through the tensile members, for example by placing a foot in a void created by the tensile members, requires a user to use ankle, knees, hips, core, wrists, elbows, shoulders and neck in non-traditional movement. This movement can be an ideal warm up or pre-workout activity. The exercise of stepping in and out of the voids created by the tensile members also forces a user to balance on one foot while extending the other foot, which both strengthens and stretches muscles, such as leg, stomach and other core muscles. In further embodiments, a user is instructed place his hands on certain tensile members or into the voids created by the tensile members, thus allowing the user to move his upper body in non-traditional movement patterns, which enables and strengthens core and upper body muscles.

In one embodiment, multiple assemblies are aligned in a row and connected via the connecting members. For example, multiple cube-shaped assemblies can be aligned on a ground to form a long passageway, for example 50 feet in length, for athletic training. Users are instructed to progress through the assemblies and perform various tasks in each assembly. Various tensile member configurations could be created inside the framed enclosures such that as a user progresses through the row of assemblies, the tasks get more challenging.

In other embodiments, the frame member supports may be between 4 and 6 feet. For example, a patient conditioning his or her muscles to perform various tasks, may be asked to stand inside the framed enclosure of the assembly and reach for certain target tensile members or move certain body parts toward or away from tensile members. A patient can be instructed to perform various tasks to increase balance, which strengthens core muscles, or tasks to increase the user's awareness of the relative position of his body parts in relation to each other.

In other embodiments, the frame support members are one foot in length such that a user would not step inside the assembly and instead would be asked to perform a task by inserting a body part into the assembly. For example, a stroke victim or other patient in need of physical therapy may be instructed to insert a hand into the framed enclosure of the assembly. The patient is then instructed to perform a certain hand movement within the assembly. The preprioceptual stimulation provided by the tensile members can provide immediate feedback to the user as to his hand's path and the different angles of the hand as it progresses over the tensile members. For example, a user may be instructed to perform a certain movement that requires the user to touch 5 tensile members at certain angles. If the user receives feedback from 6 tensile members, then the user understands that he has not followed the correct movement path. The smaller-scale assembly can also simply function as an eye-catching, colorful device that can be positioned on any surface, such as a table, desk or a floor, and that grabs the attention of children and adults alike.

In addition, the assembly can come in a kit that is a puzzle that also serves as a therapeutic device for children. Tensile members and frame member supports can come together with instructions for putting the frame member supports together. Different colors can be used for the tensile members and different, multiple shapes could be created by the frame member supports. A user can be instructed, for example, to thread the green tensile members into certain shapes, and red tensile members into other shapes. A user could also be instructed to use a specific number of tensile members to create certain patterns. In on embodiment, the kit functions as a therapeutic treatment device for users attempting to regain agility in their hands.

In the multiple embodiments described, multiple tensile members of varying resistance can be added or removed to change the different pathways and shapes created by the tensile members. The easy addition and removal of the tensile members provides an endless list of activities that can be used for both evaluation and progression of a user's skills. It is contemplated that a user's experience can be can be focused on avoiding the tensile members and forcing the body to move in untraditional patterns in order to navigate the free space pathways. A user's experience can also be focused on the complimentary use—purposeful contact with the tensile members which gives tactile and proprioception awareness and feedback.

Figure 9A:
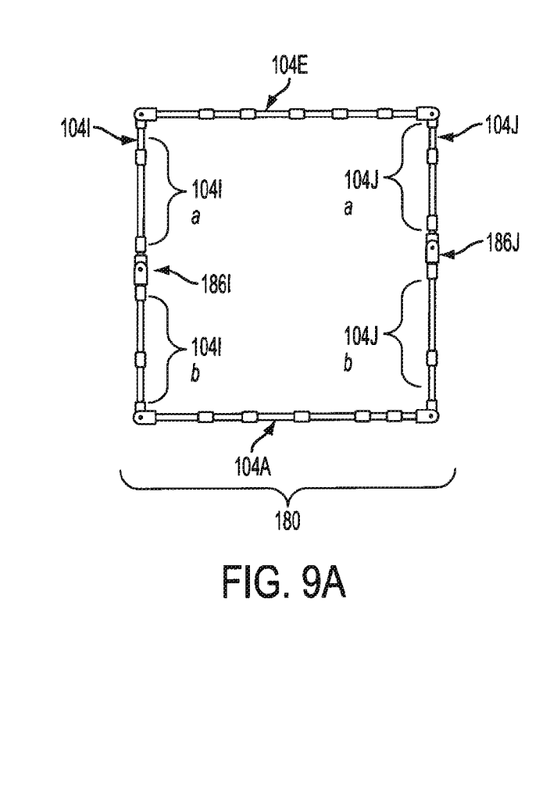
FIGS. 9A, 9B and 9C are side views of a collapsible assembly in various stages of collapse according to the present invention.
Figure 9B:
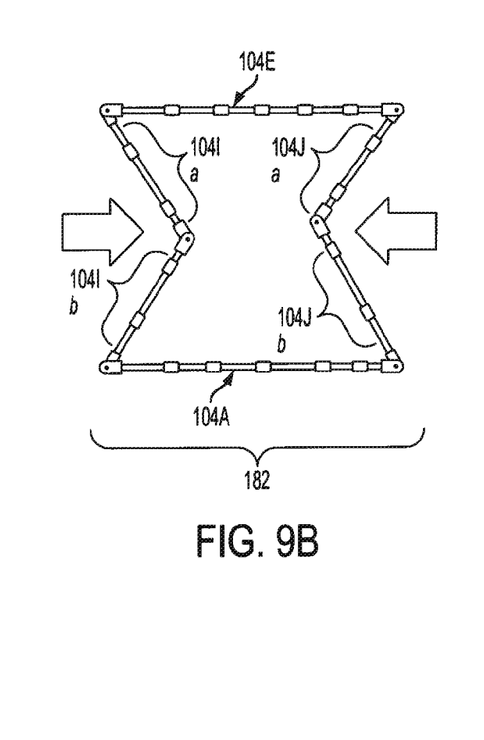
Figure 9C:
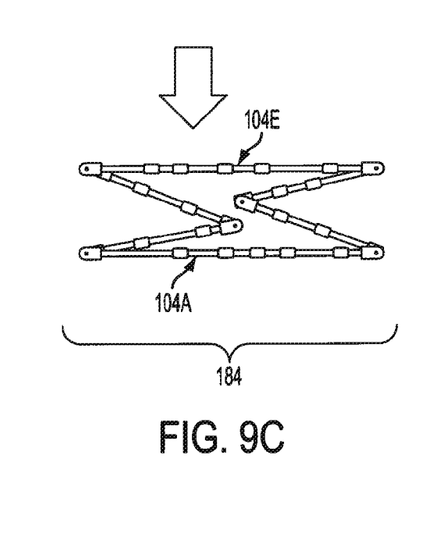

FIG. 9A illustrates a side view of a portion of the assembly with a collapsible frame. In the embodiment shown, the framed enclosure member 180 can collapse to a semi-collapsed position 182 as shown in FIG. 9B and to a fully-collapsed position 184 as shown in FIG. 9C. The assembly is collapsible for easy transport and easy storage. For ease of illustration, a front, vertical side formed by frame member supports 104A, 104E, 104I and 104J is shown. The frame member supports can be cylindrical or tubular in shape and are preferably of a lightweight metal such as aluminum or titanium, or of plastic. Upper and lower sections 104Ia and 104Ib of frame member support 104I are pivotably connected by a simple pivoting member 186I, such as a hinge or joint. Likewise, upper and lower sections 104Ja and 104Jb of frame member support 104J are pivotably connected by a simple pivoting member 186J, such as a hinge or joint. The hinge or joint is located along a longitudinal axis of each frame member support and located at substantially the center of the frame member supports 104I, J. The hinge or joint separates each vertical frame member support into two upper sections 104Ia and 104Ja and two lower sections 104Ib and 104Jb. A user who intends to collapse the framed enclosure member 180 shown in FIG. 9 applies a downward force on frame member support 104E or an upward force on 104A. The upper section 104Ia rotates counterclockwise about the hinge or pivot 186I while the lower section 104Ib rotates clockwise about the hinge or pivot 186I. The upper section 104Ja rotates clockwise about the hinge or pivot 186J while the lower section 104Jb rotates counterclockwise about the hinge or pivot 186J such that the frame support members 104A and 104E remain substantially parallel and lie substantially flat with one another.

Similar hinges or pivots attach the ends of frame support members 104A and 104E to vertical frame member supports 104I and 104J. The hinges or pivots allow the upper section 104Ia to collapse toward lower section 104Jb.

In one embodiment, the assembly comes in a kit that comprises the framed enclosure member in folded or collapsible form, multiple tensile members, tensile member connectors, and a lightweight bag that encloses the collapsable or foldable assembly for easy transport and clean storage. The kit can also include instructions for configuration of the assembly, or markings on each frame member to indicate which frame members should be positioned on the ground or floor.

In an embodiment not shown, the assembly comprises an inflatable framed enclosure member. In one embodiment, the framed enclosure is cube-shaped, while in other embodiments it is of rectangular prism, sphere, or other geometric shape. The inflatable frame allows for easy transport and storage by inflation and deflation of the framed enclosure. In one embodiment, the framed enclosure is comprised of frame support members between 4 and 6 inch in diameter. The frame support members are directly connected to one another such that separate connecting members are not used in the embodiment. The frame support members can be of plastic, latex, silicon, vinyl, polymer material, or other material. In further embodiments, the tensile members are removably connected to tensile member connectors that are attached to the frame member supports. The tensile member connectors can be traditional fasteners, such as tying straps, turnbuckles, hooks, hook and loop straps, snaps, clamps, plastic welding, or other fastening means. A user positions the soft framed enclosure member on a substantially flat surface and steps into the polyhedron-shaped enclosure formed by the framed enclosure member. As in other embodiments described, the user can be tasked with multiple activities that activate various muscle groups either within the framed enclosure or partially within the framed enclosure.

In further embodiments, the assembly is included in a kit that comprises a electronic and mechanical sensor system. An electronic or mechanical sensor is removably attached to one or more tensile members and is activated by a change in the position of a tensile member, a change in the tautness of a tensile member, or other pre-determined change in characteristic of a tensile member. The sensor gives off a signal, such as a sound or light, when activated. Using such an embodiment, a user steps into the polyhedron-shaped enclosure formed by the framed enclosure member and attempts not to touch the tensile members connected to the electronic sensors. The user can step in and out of the voids created by the network of tensile members, and the user will be provided with immediate feedback if certain tensile members are disturbed. The sensors can be set to different sensitivities such that a light brush against the tensile member may not trigger the sensor, but a touch with more force would trigger the sensor. In still further embodiments, the sensor is associated with a simple counting mechanism that keeps track of tensile members that have been touched. For example, certain tensile members may be worth a different number of points such that a user will attempt to get a high score by touching certain tensile members. By keeping score, a user's progression can be quantified and tracked by a practitioner.

In yet another embodiment, the assembly can be used as an instructional device for learning geometric angles. For example, students can be given tools to measure the angles created by the tensile members. The students can be instructed, for example, to measure certain angles and pick pre-written tags or labels—such as labels with 30°, 45°, and 90°—that match the measured angle. Students can also be instructed to find and label certain shapes—such as triangles, squares, and pentagons—created by the multiple tensile members.

The current invention allows practitioners to create a spectrum of simple to complex challenges utilizing all of the characteristics required for propriceptive adaption: balance, coordination, agility, power and range of motion. The invention allows a user to increase body positioning awareness and combines balance, strength and quickness that result in a user's heightened ability to make instant decisions about what their capabilities are in non-simulated situations. The unique structure promotes a spectrum of untraditional movements and body/limb position relationships. This is a key factor. In order to successfully navigate through the structure, a person must bend, twist, duck, flex, lift and balance the head, entire torso and all the limbs in relationships outside of normal daily movement. The structure provides a changeable multiple-pattern-guide for practically an infinite spectrum of relationships between brain, torso and limbs.

Having described only exemplary embodiments of the invention, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention.

I claim:

1. A portable assembly forming a three-dimensional polyhedron-shaped enclosure for therapeutic and athletic use, the assembly comprising:
   a plurality of frame support members;
   said frame support members being connected at ends thereof to form said three-dimensional polyhedron-shaped enclosure when erected; and
   a plurality of tensile members, each tensile member removably attached at one end to a point along a longitudinal axis of a first frame support member intermediate the two ends of said first frame support member and removably attached at another end to a point along a longitudinal axis of a second frame support member intermediate the two ends of said second frame support member; whereby said tensile members extend through and are located within and throughout said three-dimensional polyhedron-shaped enclosure and form peripheries of multiple voids inside the three-dimensional polyhedron-shaped enclosure.

2. The assembly of claim 1, wherein the three-dimensional polyhedron-shaped enclosure has the shape of a cube.

3. The assembly of claim 1, wherein the frame member and frame support members are inflatable.

4. The assembly of claim 1, wherein said tensile members are elastomeric.

5. The assembly of claim 1 further comprising multiple connecting members for receiving and being removably connected to one end of at least three frame support members, the frame support members extending from the connecting member in the direction of at least three independent axes.

6. The assembly of claim 5, wherein the connecting members are hinges or pivots that allow the frame member supports to pivot about the connecting member and along a vertical axis of the frame member supports.

7. The assembly of claim 5, wherein each independent axis is orthogonal to the other independent axes.

8. The assembly of claim 1, wherein said frame support members are cylindrical.

9. The assembly of claim 1, wherein said frame support members are of equal lengths.

10. The assembly of claim 1, wherein said frame support members are of unequal lengths.

11. The assembly of claim 1, wherein said frame support members are adjustable along a longitudinal axis of the frame member support.

12. The assembly of claim 1, wherein said tensile members have unequal diameters.

13. The assembly of claim 1, wherein said tensile members have unequal tension.

14. The assembly of claim 1, wherein said tensile members have sensors associated therewith for sensing whether a tensile member has been contacted.

15. The assembly of claim 14, wherein said sensors count the number of times a tensile member has been contacted.

16. The assembly of claim 1, wherein at least two opposing frame support members are collapsible.

17. The assembly of claim 16, wherein said opposing frame support members comprise a hinge intermediate the ends of said frame support members.

18. The assembly of claim 1, further comprising a plurality of tensile member supports slideably attached to said frame support members.

19. The assembly of claim 1, wherein the three-dimensional polyhedron-shaped enclosure has the shape of a sphere.

20. A method of using an assembly forming a three-dimensional polyhedron-shaped enclosure for therapeutic and athletic use, the method comprising the steps of:
   a. positioning an assembly on a surface, the assembly comprising a framed enclosure member having generally the shape of a three-dimensional polyhedron when erected, multiple frame support members that form edges of the three-dimensional polyhedron-shaped enclosure, the multiple frame support members supporting the framed enclosure member, and multiple tensile members, each tensile member removably attached to a point along a longitudinal axis of a first frame support member intermediate the ends of said first frame support member, the tensile member extending from said first frame support member through the three-dimensional polyhedron-shaped enclosure and removably attached to a point along a longitudinal axis of a second frame support member intermediate the ends of said second frame support member such that said tensile members form peripheries of multiple voids located inside and throughout the three-dimensional polyhedron shaped enclosure;
   b. initiating movement of at least one body part of a user in the assembly; and
   c. assessing the sensory feedback provided by the tensile members to determine the user's positioning in the assembly.

* * * * *